United States Patent [19]

Shibata

[11] Patent Number: 4,548,156

[45] Date of Patent: Oct. 22, 1985

[54] LID KNOB OF PRESSURE COOKER

[75] Inventor: Yoshikazu Shibata, Tokyo, Japan

[73] Assignee: Japan Life Co., Ltd., Tokyo, Japan

[21] Appl. No.: 570,242

[22] Filed: Jan. 12, 1984

[51] Int. Cl.[4] .......................... G10K 5/00; G08B 3/00; A47J 36/06

[52] U.S. Cl. .................... 116/70; 116/67 R; 116/137 R; 99/342

[58] Field of Search .......... 116/70, 220, 67 R, 137 R; 99/342, 344; 126/388; 137/557; 220/203, 206, 367

[56] References Cited

U.S. PATENT DOCUMENTS

| | | | |
|---|---|---|---|
| 4,155,349 | 5/1979 | Hudson | 116/70 |
| 4,418,637 | 12/1983 | Heermans | 116/70 |

FOREIGN PATENT DOCUMENTS

WO82/03543 10/1982 PCT Int'l Appl. .................. 99/344

*Primary Examiner*—Charles Frankfort
*Assistant Examiner*—W. Morris Worth
*Attorney, Agent, or Firm*—Browdy and Neimark

[57] ABSTRACT

A lid knob for a pressure cooker contains a whistle which informs the user when boiling has occurred. The lid knob is designed so that the whistle hole of the knob may be rotated into alignment with the steam hole of the lid of the pressure cooker during initial heating and then rotated out of alignment with the steam hole once boiling has occurred. The lid knob is simple in structure and is easy to disassemble for cleaning.

3 Claims, 4 Drawing Figures

LID KNOB OF PRESSURE COOKER

BACKGROUND OF THE INVENTION

The present invention relates to the lid knob of cookers such as pans, pots and others, and more particularly the lid knob of a pressure cooker which has a whistle activated by boiling within the pan and further functions to open and close a steam hole.

Pressure cookers, i.e., pans which keep the steam from leaking outside and thus heighten the pressure and the boiling point within them, thereby shortening cooking time have been used for some time. Ingredients are put into the pan when the water is fully boiled. If a boiling informer were furnished, overboiling would be avoided and fuel would be saved.

SUMMARY OF THE INVENTION

An object of the present invention is to provide a lid knob for a pressure cooker which may signal boiling and is simple in structure and easy to open and clean by disassembling.

The lid knob of the pressure pan according to the present invention comprises a thumb which is composed of a middle shaft securing a female tube, a middle wall holding a spring together with the middle shaft and a skirt defining the outer circumference of the thumb 1; a stand of a dish shape which is centrally provided with a sleeve for receiving the middle shaft and the spring, and is penetrated with a hole communicating with a steam hole formed in a pan lid, and is downwardly extended with a stopper; and a guide plate which is centrally provided with a sleeve for receiving an exposed portion of the female tube and is defined with a guide hole for the stopper, and is provided on a reverse side of the circumferential part with a fitting portion to be fitted in a whistling depression defined in the pan lid, and is opened centrally of the fitting portion with a steam hole communicating with the steam hole of the pan lid.

DETAILED DESCRIPTION OF THE INVENTION

Figure 1:
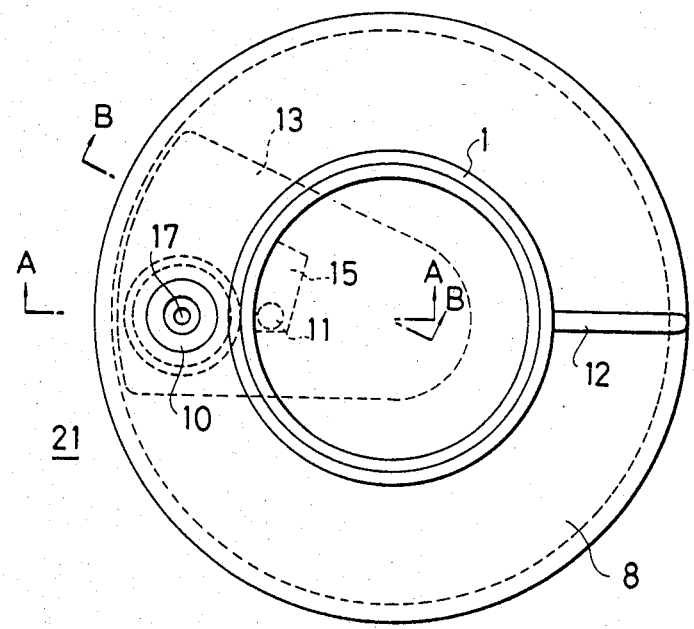
FIG. 1 is a plan view of an embodiment of the invention.
Figure 2:
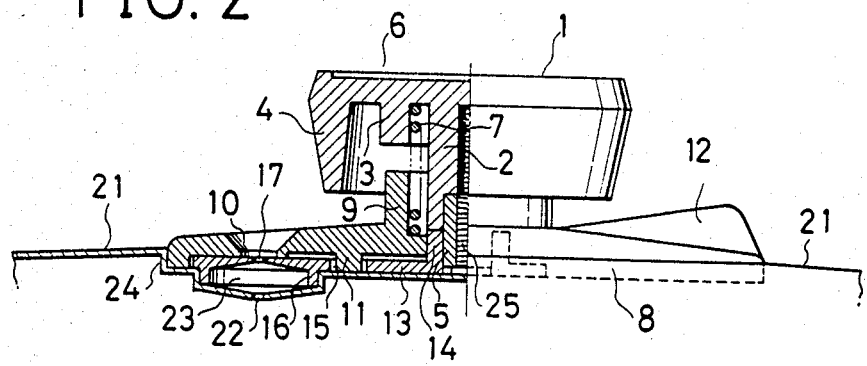
FIG. 2 is a cross sectional view seen from A—A in FIG. 1.
Figure 3:
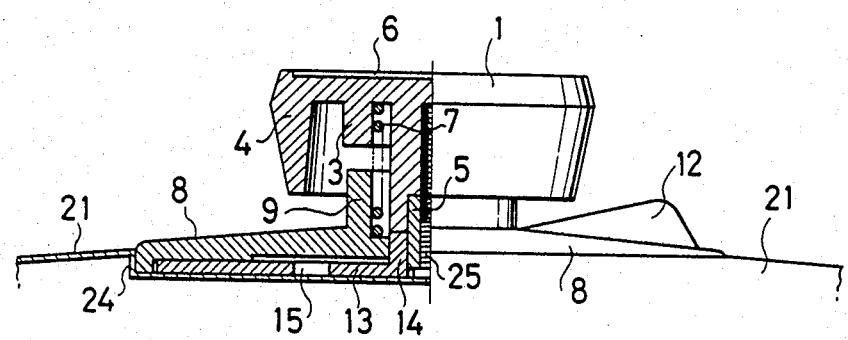
FIG. 3 is a cross sectional view seen from B—B in FIG. 1.
Figure 4:
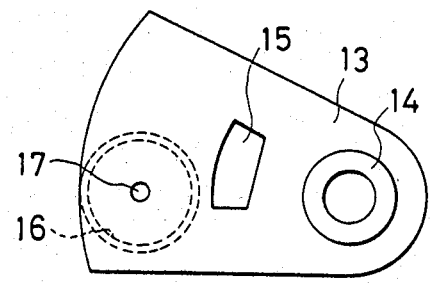
FIG. 4 is a plan view of one example of a guide plate.

The attached drawings show an embodiment of the invention. A thumb 1 is composed of a middle shaft 2, a middle wall 3 and a skirt 4. The middle shaft 2 is mounted on its end portion over the upper half of a female tube 5, or may be inserted with the female tube 5 over the full length of the middle shaft 2. Between the shaft 2 and the wall, a spring 7 is furnished to press down on stand 8 later mentioned. The thumb 1 is formed with a depression 6 for the placement of a a brand plate.

The stand 8 shaped is like a shallow dish and is centrally provided with a sleeve 9 for holding the shaft 2 and the spring 7 therein and has defined therein a hole 10 of conical shape communicating with a steam hole 22 of a pan lid 21. Further, the stand 8 is, on its reverse side, equipped with a stopper 11 extending downward, and is, if desired, formed with a pinch 12 of a suitable shape on its surface.

A guide plate 13 is provided with a sleeve 14 into which fits a lower exposed portion of the female tube 5, and is further formed with a guide hole 15 in the form of an arc contacting the stopper 11 at a part thereof. On a circumferential part of the reverse side, a circular fitting portion 16 is provided for fitting in a whistling depression 23 defined on the pan lid. The fitting portion 16 is centrally formed with a steam hole 17.

The pan lid 21 is defined with an exterior shallow depression 24 for receiving the stand 8 in addition to the whistling depression 23, and is centrally attached to a screw 25 which passes through tube 5 and finally into shaft 2 of thumb 1. Thus, pan lid 21 and tube 5 are secured to thumb 1 and the pan lid secured to the lid knob.

The knob according to the invention is set up by mounting the fitting portion 16 into the whistling depression 23 so that the guide plate 13 is attached to the pan lid 21, subsequently covering the stand 8 thereon such that the stopper 11 is positioned within the guide hole 15, and finally, securing the female tube 5 to the male screw 25 as the spring 7 is attached to the middle shaft 2 and thereby affixed to the thumb 1. The stand 8 and the guide plate 13 have no play since they are pressed down by the spring 7. Disassembly may be achieved in the reverse manner as above. Since both assembly and disassembly may be easily performed, the present invention is conveniently cleaned by disassembling.

When heating the pan before cooking, the hole 10 of the stand 8 and the steam hole 17 of the guide plate 13 are aligned by means of the pinch 12. When the pinch 12 is laterally moved, the stand 8 is easily rotated around an axis of the sleeve 14 of the guide plate 13 within a range restricted by the guide hole 15. The stopper 11 contacts the edge portion of the guide hole 15 at a position where the hole 10 and the steam hole 17 coincide with each other, therefor, alignment may be easily obtained between the hole 10 and the steam hole 17. Under such a condition, when boiling occurs, the steam goes into the whistling depression 23 from the steam hole 22 and escapes from the steam hole 17 to the hole 10, and a whistling noise is made. Then, stand 8 is once again rotated by means of pinch 12 so that the hole 10 is out of alignment with the steam hole 17 and the steam hole 17 is closed by the reverse side of the stand 8 and the pan thus sealed. Then, the ingredients may be placed into the cooker or the heat appropriately lowered.

As the invention is as having mentioned above, boiling is accompanied by whistling and cooking may be made more efficient by closing the steam hole at this time and placing the ingredients into the cooker or lowering the heat. Accordingly, overboiling is prevented and fuel is saved. In addition, cleaning is easily carried out by disassembly.

It is to be understood that the present invention is not limited to the embodiments disclosed which are illustratively offered and that modifications may be made without departing from the invention.

I claim:

1. A lid knob for a pressure cooker, comprising a thumb which is composed of a middle shaft secured to a female tube, a middle wall, said middle shaft and said middle wall defining a space holding a spring, and a skirt defining an outer circumference of said thumb; a dish-shaped stand which is centrally provided with a sleeve for receiving the middle shaft and the spring, said stand having a hole therein communicating with a steam hole formed in a lid of said pressure cooker, said stand having a downwardly extending stopper; a guide plate which is centrally provided with a sleeve for receiving an exposed portion of the female tube and which also defines a guide hole for the stopper, said guide plate provided on a reverse side of a circumferential part thereof with a fitting portion to be fitted in a whistling depression defined in said lid, said guide plate being open centrally of the fitting portion to form a steam hole communicating with the steam hole of said lid; means, fitting within said female tube, for mounting said lid knob to said lid.

2. A lid knob for a pressure cooker as claimed in claim 1, wherein the thumb, the stand and the guide plate are made of plastics.

3. A lid knob for a pressure cooker as claimed in claim 1, wherein the stand is provided with a pinch means for permitting grasping and moving of said stand.

* * * * *